UNITED STATES PATENT OFFICE.

CONSTANTINE FAHLBERG, OF BALTIMORE, MARYLAND.

IMPROVEMENT IN PROCESSES FOR UTILIZING ZINC SULPHATE.

Specification forming part of Letters Patent No. 200,134, dated February 12, 1878; application filed January 10, 1878.

*To all whom it may concern:*

Be it known that I, CONSTANTINE FAHLBERG, of the city of Baltimore, State of Maryland, have invented certain new and useful Improvements in Processes of Utilizing Zinc Sulphate; and I hereby declare the same to be fully, clearly, and exactly described as follows:

Zinc sulphate is a product of the treatment of certain ores of lead, and also of the action of galvanic batteries, and, being practically impossible of reduction, is a waste product of very slight commercial value.

My invention consists in a special treatment of zinc sulphate to form reducible compounds of the metal, and in rendering the process continuous by the recovery of the reagents by an ammonio-soda process.

To this end I treat zinc sulphate with the equivalent quantity of sodium carbonate or bicarbonate, the resulting double decomposition forming zinc carbonate, which may then be reduced by ordinary means, and sodium sulphate, which latter, being in solution, is simply decanted.

The sodium sulphate is next made the basis of an ammonio-soda process, as follows: The solution of sodium sulphate is treated with ammonia and carbonic-acid gas in a manner similar to that in use for the production of sodium bicarbonate by the well-known ammonio-soda process, in which sodium chloride is employed as the basis.

As end products of the decomposition, sodium bicarbonate and ammonia sulphate are formed, which salts are readily separated by taking advantage of the superior solubility of the latter.

The so-formed sodium bicarbonate is next treated with a fresh charge of zinc sulphate, resulting, as before, in the formation of sodium sulphate and zinc carbonate, the extra equivalent of carbonic-acid gas being given off. The latter is used in producing sodium bicarbonate, as above. The ammonia sulphate formed in the ammonio-soda process is next decomposed by caustic lime, and the ammonia is used in the production of a further supply of sodium bicarbonate.

The reactions named may be formulated as follows: (*a*) $Zn,SO^4 + 2Na,H,CO^3 = Zn,CO^3 + Na^2,SO^4 + CO^2 + H^2O$. (*b*) $Na^2,SO^4 + 2NH^3 + 2CO^2 + 2H^2O = (NH^4)^2SO^4 + 2Na,H,CO^3$. (*c*) $(NH^4,)^2SO^4 + Ca,O = H^2O + CaSO^4 + 2NH^3$.

Obviously the zinc carbonate may be readily reduced to the metallic state. To this end it is roasted, the so-evolved gas being saved to make up for waste in the ammonio-soda process, the zinc oxide being finally reduced by means of carbon.

The lime used in decomposing the ammonia sulphate being, preferably, burned on the premises, its carbonic-acid gas is utilized as the main source of supply for producing the sodium bicarbonate. In default of this, carbonic-acid gas may be obtained from the products of combustion under the boiler of the engine used to drive the pumps, &c.

It will be seen from the foregoing description that, theoretically, the process is perfectly continuous, the necessary reagents being supplied from the treatment of fresh charges of zinc sulphate.

In practice a slight loss is necessarily experienced; but it is wholly insignificant.

The importance of the process described will be appreciated when it is considered that it effects the conversion of zinc sulphate—an almost worthless salt—into compounds which are readily reducible to metallic zinc, and that, too, without involving material waste of reagents or formation of by-products.

I do not consider it necessary to here enter into a description of apparatus necessary for carrying out the above process. Any one skilled in the art will find no difficulty in devising suitable means for putting the process into successful practice.

Instead of reducing the carbonate of zinc to metallic zinc, the salt may obviously be sent direct into commerce. The comparative market price of the metal and its carbonate will determine the course of the operator.

Having thus described my invention, what I claim as new, and desire to secure by Letters Patent, is—

The process herein described for the utilization of zinc sulphate, consisting in first precipitating the zinc as carbonate by means of sodium carbonate or bicarbonate, and then recovering the sodium bicarbonate by an ammonio-soda process, thus making the whole continuous.

CONSTANTINE FAHLBERG.

Witnesses:
  R. D. WILLIAMS,
  GEO. W. HOPKINS.